United States Patent [19]

Klaue

[11] Patent Number: 5,253,737
[45] Date of Patent: Oct. 19, 1993

[54] AUXILIARY BRAKE FORCE MULTIPLYING SPRING IN A MULTIDISC SERVICE AND AUXILIARY BRAKE SYSTEM

[75] Inventor: Hermann Klaue, Montreux, Switzerland

[73] Assignee: Datwyler AG, Altdorf, Switzerland

[21] Appl. No.: 798,284

[22] Filed: Nov. 25, 1991

[51] Int. Cl.$^5$ .................... B60T 8/32; F16D 55/24
[52] U.S. Cl. ....................... 188/71.5; 188/71.8; 188/72.3; 188/170; 192/85 AB; 192/111 A
[58] Field of Search .................. 188/140 A, 71.5, 71.8, 188/71.7, 196 R, 170, 105, 264 E, 72.3; 192/85 AB, 111 A, 70.25, 91 A, 70; 303/71

[56] References Cited

U.S. PATENT DOCUMENTS

| | | | |
|---|---|---|---|
| 3,770,085 | 11/1973 | Cottingham | 188/170 X |
| 4,096,926 | 6/1978 | Klaue | 188/71.4 |
| 4,232,763 | 11/1980 | Klaue | 188/71.5 X |
| 4,640,400 | 2/1987 | Nakane et al. | 192/70.25 |

FOREIGN PATENT DOCUMENTS 3725624  2/1989  Fed. Rep. of Germany ..... 188/71.5

*Primary Examiner*—Robert J. Oberleitner
*Assistant Examiner*—Josie A. Ballato
*Attorney, Agent, or Firm*—Herbert Dubno

[57] ABSTRACT

A full lining operating brake for a heavy duty vehicle is also provided with a parking or auxiliary brake in the form of a heat storing stack of brake plates within the brake carrier of the operating brake and between the carrier and a sleeve connected to the hub upon which the wheel is mounted. A belleville washer spring stack acts upon the stack of plates through a force multiplier disk and is itself relieved to permit the wheel to rotate by the pneumatic displacement of a tube which draws the spring stack away from the brake plate stack.

9 Claims, 2 Drawing Sheets

AUXILIARY BRAKE FORCE MULTIPLYING SPRING IN A MULTIDISC SERVICE AND AUXILIARY BRAKE SYSTEM

FIELD OF THE INVENTION

My present invention relates to a heavy duty disk-type brake especially for use with heavy-duty vehicles, for example, industrial trailers, semitrailers, heavy trucks and the like, in which an annular brake disk extends completely around an axis of a rotating member such as a wheel to be braked and is fully lined around this axis.

BACKGROUND OF THE INVENTION

Disk-type brakes, because of their planar braking surfaces have the advantage of having straight-line characteristics by contrast with the nonlinear characteristics of drum-type brakes, so that in use, disk-type brakes can avoid swerving of the vehicle, even in the case of heavily loaded heavy-duty vehicles. For this reason segmental disk brakes have been widely employed in recent years for passenger automobiles and the like. Drum-type brakes because of the nature of the heat dissipation therefrom by convection, are generally superior to such segmental disk brakes on thermal grounds. As a result, for heavy duty vehicles operating under heavy loads, drum-type brakes have been predominantly employed. If, for example, the braking system provides segmental disk brakes at the front axle of such a vehicle, it is necessary to ensure that the vehicle will have retarders, engine braking systems or auxiliary brakes to provide the additional braking capacity which may be necessary, at a considerable cost, increasing vehicle weight and providing a challenge to the reliability of the brake system.

A full-lining brake, by contrast to the segmental disk brakes described above, however, for a given weight and fabrication cost, has thermal advantages over drum-type brakes as can be demonstrated readily in road tests. For example, in braking over a downgrade of 10% at a speed of 60 km/h, a two-surface full lining brake with a brake housing having radial heat dissipating ribs in less than a minute of braking time can achieve a thermal equilibrium between the braking heat generated and the convective heat dissipated at a temperature range which does not give rise to significant brake wear for present-day standard linings. By contrast, a drum-type brake does not, under similar conditions, reach a steady state temperature even after 10 minutes and at such a brake duration, will reach the 700° C. maximum which such a brake can tolerate. A segmental disk brake of the type widely used in automotive vehicles under similar conditions can reach a temperature of 1000° C.

Without significant increase in weight, full lining brakes can have their continuous braking effect increased by providing a direct compressed air actuation with four brake surfaces per brake and each wheel brake provided with two brake circulations. Such systems are described, for example, in German Patent Documents DE 37 05 911 and DE 37 256 24. These systems, however, are not fully satisfactory because they do not provide for parking brake or emergency or auxiliary braking action, i.e. for vehicle-locking or like brake action.

OBJECTS OF THE INVENTION

It is, therefore, the principal object of the present invention to provide an improved full-lining brake which is free from the drawbacks outlined above.

Another object of my invention is to provide a full lining brake for a heavy duty automotive vehicle which has optimal thermal characteristics and in a compact and weight-saving manner, provides a wheel locking or auxiliary braking function.

Yet another object of my invention is to provide a full lining heavy duty brake which is more reliable and efficient than earlier brakes.

SUMMARY OF THE INVENTION

These objects and others which will become apparent hereinafter are attained, in accordance with the invention, by providing within the brake carrier of a full-lining disk brake, a stack of brake plates or lamella which functions as a heat-storage unit and which is arranged between a projection extending from the wheel hub, i.e. a sleeve rotatable with the wheel hub, and the brake carrier for the full lining brake, the brake plates alternately being angularly entrained alternately with this sleeve and with the carrier. Spring means is provided for biasing the plates of the stack into engagement and compressed air is used to relieve the brake plates from the force of the spring means. More particularly, the brake can comprise:

a stationary cylindrical brake carrier;

a plurality of annular brake disks axially shiftable and angularly fixed on the brake carrier and surrounding same, the brake disks being formed with friction brake linings;

a brake housing surrounding and enclosing the disks and connected with a wheel to be braked, the housing being juxtaposed with the linings and frictionally engageable thereby and being formed with radial convectively heat-dissipating ribs;

actuating means between the disks for urging the disks against the housing to brake the wheel; and a wheel locking and auxiliary brake within the carrier comprising:

a sleeve affixed to a hub of the wheel and extending axially into the carrier coaxial therewith and defining an annular compartment with the carrier, an axial heat-storing stack of axially movable braking plates received in the compartment and including plates formed with friction linings and angularly connected to the sleeve and plates alternating therewith and angularly connected to the carrier, spring means biasing the plates into mutual frictional contact, and compressed air actuated force-relieving means effective to counteract the spring means and relieving a force thereof on the plates to permit rotation of the wheel.

According to a feature of the invention, the spring acts upon the stack of brake plates through a force-transmitting plate spring via an actuating tube and the compressed air means can cooperate with an annular piston which can relieve the pressure of that plate spring on the stack of brake plates.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
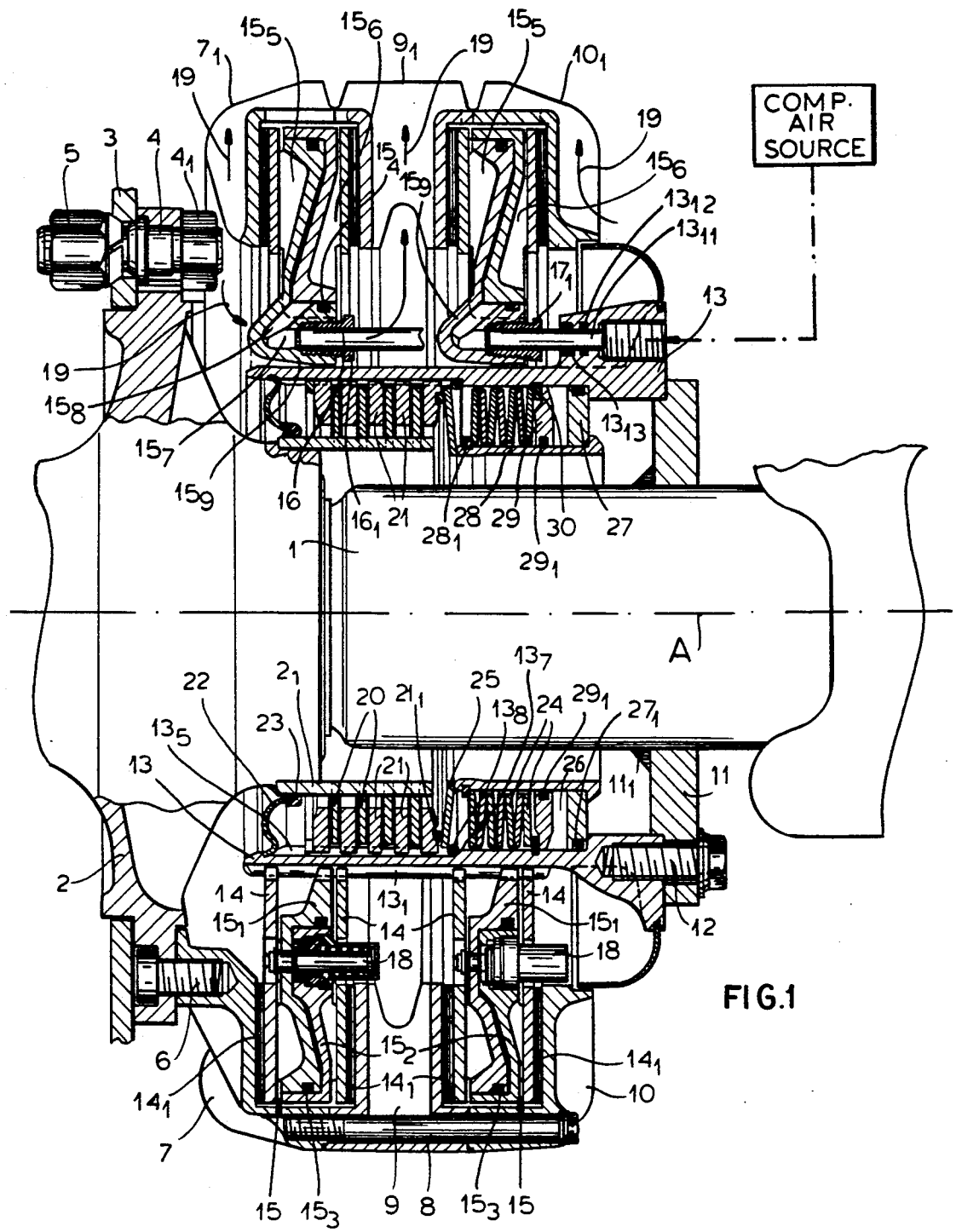
FIG. 1 is an axial cross sectional view of a wheel brake according to the invention, shown as built into the axle of a trailer, the upper half illustrating the compressed air feed to the operating brake while the lower half shows the restoring and adjusting devices for the operating brake which are angularly equispaced about the axis thereof.

The brake arrangement shown in FIG. 1 comprises the axle body 1 and a wheel 3 (shown only in part) connected with a hub 2 by means of wheel bolts 4 anchored to the hub by nuts $4_1$, the wheel being held on the bolts 4 by lug nuts 5.

Further bolts 6 attach the hub 2 to a radially ribbed brake housing section 7 which is connected, to form the brake housing, with a hollow disk 9 and a housing cover 10 by tie bolts 8. The radial ribs of the housing portion 7 are represented at $7_1$ while the radial ribs of the hollow disk 9 and of the housing section 10 are represented respectively at $9_1$ and $10_1$.

The axle body 1 has a flange 11 welded thereto at $11_1$, a cylindrical brake carrier 13 being affixed to the flange 11 by the bolts 12. The brake carrier 13 has an outer (external) spline $13_1$ on which steel brake disks 14 provided with adhesively bonded or sintered brake linings $14_1$ are axially shiftable but angularly entrained with the brake carrier 13. The brake linings extend over the full surfaces of the brake disks 14, i.e. all around the axis A of the brake.

The brake linings 14, on the disks 14 are juxtaposed with portions of the housing parts 7, 9, 10 and are axially displaceable with the disks 14 for operation of the brake by two light metal (e.g. aluminum-alloy) die cast parts $15_1$ and $15_2$ disposed between each pair of brake disks 14. Each of these two members $15_1$ and $15_2$ forms a respective actuating means between the respective pair of disks 14 for urging them apart and against the housing to brake the wheel 3. The actuating units for each pair of disks 14 are represented generically at 15 and can have radial ribs $15_5$ and $15_6$ (upper portion of FIG. 1) which actually press against the plates 14. The actuating units 15 are sealed via rubber, polyimine, sintered metal or gray cast iron sealing rings $15_3$ and $15_4$ respectively.

For feeding the compressed air for actuating the operating brakes, pipe or hose fittings (not shown) are provided for direct or articulated connection with a threaded bore $13_{11}$ formed in the carrier 13. Into the latter, tube 17 can extend and can be sealed by packing rings $13_{12}$ and shielded from the incursion of dirt by sleeves $13_{13}$.

The tube 16, also connected with a compressed air source via a bore similar to the bore $13_{11}$, and the tube 17 are clamped in the respective members $15_1$ by means of compression fittings $16_1$ and $17_1$ threaded into the bores $15_7$ of a flange portion $15_9$ of the respective member $15_1$. The bores $15_7$ are connected by passages $15_8$ to a space between the members $15_1$ and $15_2$ so that the supply of compressed air through these passages will spread members $15_1$ and $15_2$ apart and apply the operating brake. The two actuators 15 are provided in respective compressed air systems so that the operational braking is a dual brake system.

When the brake pressure is relieved, the encased restoring and adjusting units 18 angularly equispaced around the brake return to their starting positions and restore the brake play while adjusting for wear of the brake linings. The adjusting unit is shown in greater detail in FIG. 3. This eliminates any tendency for a residual brake torque and prevents, by avoiding an excessive air gap, the development of noise or a lag in brake actuation.

Figure 3:
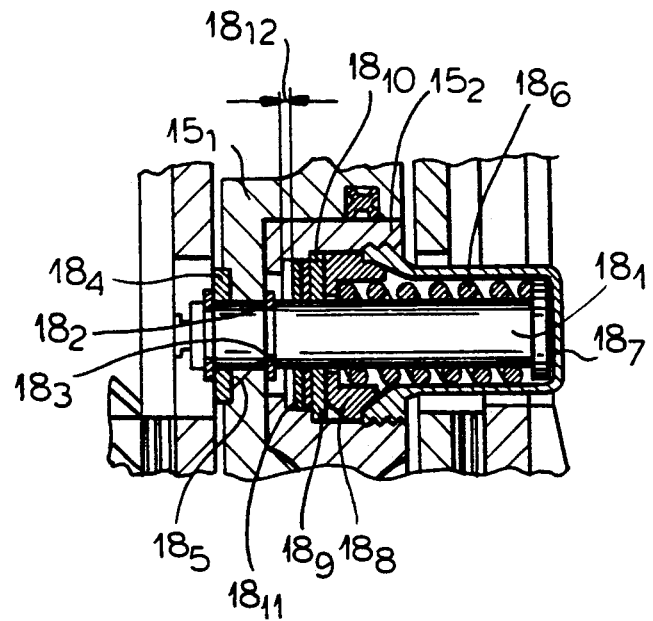
FIG. 3 is a detail section showing the restoring and adjusting device for the operating brake to a larger scale.

The restoring system is shown closer to full size in FIG. 3 (by contrast to FIG. 1 which is greatly reduced in scale). The restoring and adjusting unit 18 can be seen to comprise pins $18_1$ connected to the respective actuating member $15_1$ by split rings $18_2$ and $18_3$, a washer $18_4$ and a seal $18_5$. On the pin $18_1$ is a precompressed restoring spring $18_6$ which is braced via a seating ring $18_8$ against the other brake actuator member $15_2$. Threaded onto the member $15_2$ is a sleeve or cap $18_7$ which prevents the incursion of brake lining dust and road dirt. The threaded sleeve $18_7$ bears rollingly with its conical inner surface against the housed edge of the seating ring $18_8$.

The seating ring $18_8$ is held against an axially fixed washer $18_{10}$ and is sealed relative to it by a sealing ring $18_9$. In the pressurizable compartment of the actuating units 15, the washers $18_{10}$ bear against the flat-ground compression rings $18_{11}$ which are dimensioned to frictional engage the pins $18_1$ with radial prestress and generate against these pins with a friction force which can take up the axial force generated by the spring $18_6$.

The ring $18_{11}$ can be accommodated with play in a cylindrical recess in the member $15_2$, the thickness of the ring $18_{11}$ defining the brake play. The brake play is indicated in FIG. 3 at $18_{12}$.

Should the wear of the brake lining give rise to an increase in the brake play, the actuating force applied by the compressed air between the members $15_1$ and $15_2$ which define an expandable chamber between them will be sufficient to slide the ring $18_{11}$ along its pin $18_1$ on which the ring will be retained upon release of the brake, to thereby adjust the brake to restore the play $18_{12}$ and compensate for the wear of the lining.

The complete encasing of the restoring and adjusting device prevents brake lining dust and street dirt from entering during the life of the brake.

When a lining replacement is required, after a considerably longer operating brake life than has generally been the case with earlier brakes because of the reduced thermal stress resulting in part from the highly ribbed outer surface of the brake housing, the actuator need not be taken apart but only requires compression which will in any event result when the housing is bolted back together after reassembly of the brake.

Arrows 19 in FIG. 1 signify the flow of air for cooling of the operating brake by the passage of air along the radial ribs thereof. The braking heat is largely dissipated by convection, limiting the temperature increase even over prolonged travel over downhill stretches, to a level below that at which the major portion of the heat dispersion can be effected by radiation.

The braking system can operate under load with commercial valves for control of the fluid pressure and both in operation and for emergency or for emergency braking through the use of hand operated valves. When the brake is used on a trailer it can be directly actuated although it may automatically be operated in response to the braking of the towing vehicle.

Regardless of how the operating brake is used and where the operating brake is provided on a heavy-duty vehicle, it is important that it be provided, according to the invention, with auxiliary brake means which can be used for emergency braking should the vehicle be separated from the towing vehicle, for parking the trailer or as an auxiliary brake to assist in emergency braking.

The parking, auxiliary or emergency brake of the invention is located within the brake carrier and serves as a heat storage structure in the case in which the operating brake may be required to function under extreme conditions. This auxiliary brake comprises a stack of lamella or brake plates 20 which are axially movable on a projection or sleeve $2_1$ connected to the hub 2, coaxial with the brake carrier 13 and extending into the latter. The plates 20 are angularly entrained with the sleeve $2_1$ and alternate with lamella or brake plates 21 which are axially freely movable on an inner spline $13_5$ of the brake carrier 13 and are angularly coupled therewith, i.e. are stationary.

To encase the space or compartment between the hub 2 and the axle 1, 11, a sheet metal apron 22 is provided and has a shaft seal 23 of self-lubricating rubber engaging the sleeve rubber engaging the sleeve 21 and prevents, penetration of brake lining dust and road dirt into this space. For actuating this parking brake, an emergency storage spring 24 formed from a stack of belleville washers is provided. The spring stack is braced against a split ring 30 and engages, at the opposite end of this stack, a split ring $28_1$ which is anchored to an actuating tube 28.

The spring force is applied by a force transmitter or force multiplier in the form of a plate spring 25 to the plate stack 20/21 to hold the wheel 3 against rotation.

The plate spring 25 is fulcrummed against a spring ring $13_8$ braced, in turn, against a step $13_7$ of the carrier 13 and bears against a spring ring $21_1$ in an end plate of the stack 20/21. The spring stack 24 is precompressed and thus prestressed so that the parking brake is held engaged in the absence of a force relieving this spring force. In the position shown, however, the spring 24 which bears on the tube 28 is further stressed and the parking brake is relieved.

Figure 2:
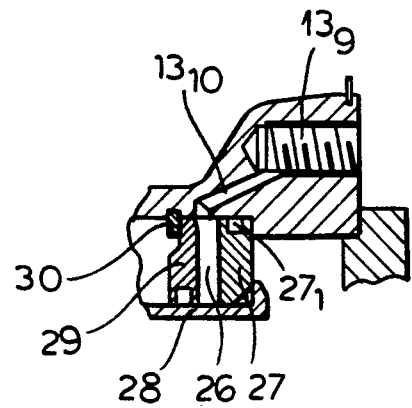
FIG. 2 is a partial section illustrating the air feed to the parking brake.

The fluid pressure for this purpose is supplied via a threaded fitting $13_9$ connected by a pipe or hose to a compressed air source (not shown). A bore $13_{10}$ delivers the air pressure from fitting $13_9$ (FIG. 2) to a chamber 26 disposed between a piston 27 engaged with an end of the tube 28 and a plate 29 which is braced against the spring ring 30.

The application of the compressed air to the chamber 26 draws the tube 28 to the right and thereby relieves the force on the brake plate stack 20/21 so that the parking brake is relieved. Seals $29_1$ and $27_1$ seal the chamber 26.

I claim:

1. A full-lining brake for a heavy duty vehicle, comprising:
    a stationary cylindrical brake carrier;
    a plurality of annular brake disks axially shiftable and angularly fixed on said brake carrier and surrounding same, said brake disks being formed with friction brake linings;
    a brake housing surrounding and enclosing said disks and connected with a wheel to be braked, said housing being juxtaposed with said linings and frictionally engageable thereby and being formed with radial convectively heat-dissipating ribs;
    actuating means between said disks for urging said disks against said housing to brake said wheel; and
    a wheel locking and auxiliary brake within said carrier comprising:
        a sleeve affixed to a hub of said wheel and extending axially into said carrier coaxial therewith and defining an annular compartment with said carrier,
        an axial heat-storing stack of a multiplicity of axially movable braking plates received in said compartment and including a multiplicity of plates formed with friction linings and angularly connected to said sleeve and a multiplicity of plates alternating therewith and angularly connected to said carrier,
    spring means biasing said plates into mutual frictional contact, and
    compressed air actuated force-relieving means effective to counteract said spring means and relieving a force thereof on said plates to permit rotation of said wheel, said spring means including:
        a force-transmitting force-multiplying plate spring acting upon said stack,
        an axially shiftable actuating tube engaging said force transmitting plate spring, and
    a spring bearing on said tube;
        said force relieving means including an annular piston operatively connected with said tube and actuatable by compressed air to shift said tube.

2. The brake defined in claim 1 wherein said spring is a stack of dished-disk belleville washers braced between a split ring engaged with said tube and a split ring engaged with said carrier.

3. The brake defined in claim 2, further comprising a sheet metal apron connected to said carrier and having an annular seal slidably engaging said sleeve.

4. The brake defined in claim 3 wherein said force-transmitting plate spring has an outer edge braced against a shoulder of said carrier.

5. The brake defined in claim 4 wherein said actuating means includes a pair of actuating disks axially shiftable on said carrier and disposed between the brake disks and defining an expandable chamber; and
    means for feeding compressed air to said chamber.

6. The brake defined in claim 5 wherein said means for feeding compressed air to said chamber includes a tube connected to one of said actuating disks defining said chamber and axially movable therewith, a fitting on said carrier connectable to a compressed air source, and sealing means between said tube and said fitting permitting axial movement of said tube in said fitting.

7. The brake defined in claim 6 wherein the other of said actuating disks defining said chamber is axially shiftable on said one of said disks.

8. The brake defined in claim 7, further comprising adjusting means between said actuating disks defining said chamber for adjusting an actuating play of said brake disks to compensate for wear of said linings on said brake disks.

9. The brake defined in claim 8 wherein said adjusting means includes restoring means for drawing said actuating disks defining said chamber toward one another upon relief of pressurization of said chamber.

* * * * *